Inventors
VIKTOR LANGEN
JOSEF LATZEN

By Robert H. Jacob
Agent

United States Patent Office 2,937,895
Patented May 24, 1960

2,937,895

BALL AND SOCKET JOINTS

Viktor Langen and Josef Latzen, Dusseldorf, Germany; said Langen and Anneliese Latzen, sole heir of Josef Latzen, deceased, assignors to A. Ehrenreich & Cie, Dusseldorf-Oberkassel, Germany Filed May 7, 1956, Ser. No. 583,053

Claims priority, application Germany May 9, 1955

3 Claims. (Cl. 287—87)

The invention relates to a ball and socket bearing with angular mobility in particular for use in motor vehicles for example for their steering parts in which a journal via a spherical ball in a hollow spherical socket of a casing rests on the side turned towards the outlet of the journal from the casing.

In joints of the aforementioned kind which are often referred to as universal ball and socket joints it is desirable to improve the sliding between the spherical body and the hollow spherical surface in the casing forming the seating for same or to give the seating of the spherical body in the hollow spherical surface a certain elasticity in order to render it possible for the articulated bearing to make small shocks and oscillations harmless. For this, the spherical body may consist of a suitable plastic material, for example, fabric impermeated with resin or an artificial material belonging to the group of polyamides, superpolyamides or polycondensation products with reticulated structure, Vulkollane of the Farbenfabriken Bayer or the like. The spherical body can be formed from a core, for example, of steel, bronze, sintered iron, light metal, fabric permeated with resin or the like and be provided with a coating of plastic. If the sliding surface of the spherical body consists of one of the materials mentioned then it is advantageous for the sliding surface at the parts on which the edges must be slid over to be subject to wear and tear stresses whether the plastic in consequence of elastic properties under load or thrust stresses swells before the edges or whether the edge effects a scraping action on the plastic.

According to the invention the spherical body has an outer surface of plastic or other material of less hardness and particularly good bearing properties and the outer surface of the spherical body contacting with angular movements the inner limiting edges of the casing passage for the journal is provided with a wear resistant and incompressible covering for example of steel plate which in any position of the spherical head covers the inner limiting edges of the casing passage. Thereby in the choice of material for the spherical body and in particular for the formation of its upper surface no regard need be taken to the effects of the edges to be passed over on the spherical body with angular movements so that even joint bearings with spherical heads the upper surfaces of which form improving the behaviour of the bearings with shocks and oscillations is more or less elastic or of plastics with such properties but improved sliding properties without adversely affecting the life and working reliability are possible.

The covering may have the form of a cap concentric with its outer surface of the hollow conical surface in the casing whereby the diameter of the spherical head in the part covered by the cap is so offset that the outer surface of the part of the spherical head not covered by the cap is in alignment with the outer surface. In this case the spherical body has to a certain extent a shape retaining protection against stresses by the edges to be passed over.

If the joint bearing is so constructed that the joint pin passes through a spherical section which forms the bearing spherical body for the joint pin, then the edge directed towards the passage opening for the spherical journal in the spherical section is bent and the part of the passage gripped by the bent edge of the cap can be so enlarged that the surface of the edge engaging over turned towards the journal is flush with the remaining passage surface. In this way the passage in the spherical section receives on the outlet side on which there is most stress with angular movement, an edge protection.

Another embodiment of the invention consists in forming the covering of a hollow spherical zone sunk in the outer surface of the spherical body and with its upper surface in alignment with the upper surface of the spherical body.

If the spherical body consists of a core with a covering of particularly good bearing properties in particular of plastic having such properties then the covering can be passed through by ribs or other projections of the core which are in alignment with or almost in alignment with the covering surface. If the covering surface projects slightly over the surface of the ribs then the covering surface as regards its favourable properties for the bearing and sliding as well as for the damping comes fully into effect whilst shock and other stresses for the taking of which the covering is not adapted and compared with which it is flexible are taken up by the ribs of the core.

With the cap-like construction of the body forming the protective surface it may be advisable to provide between the edge of the cap turned towards the journal and the journal a spring ring on the journal which is arranged in a peripheral groove of the journal. This spring ring acts as a position locking means for a spherical section passed through by the journal and for the cap. In addition the spring ring takes the tilting movement.

The drawing illustrates different embodiments of the invention with reference to suspended carrying joint.

In all embodiments the bearing and sliding surface of the spherical body is defined by a spherical section in a hollow spherical surface of the casing or socket 1 on the side turned towards the stud 2. Of course this bearing surface can also be formed by an inserted cup or the like.

The stud 2, which has a ball 3, passes rotatably through the spherical body and is supported with its head on the spherical section. It would also be possible to connect the spherical body firmly to the journal which for example could be effected by bonding if the spherical body consists of a more or less resilient plastic. With the use of rubber the spherical body could be vulcanised.

The embodiments shown according to Figs. 1, 2, 3 and 5 are provided with a spherical body or ring 4 in the form of a spherical section which consists of a suitable plastic for example of the group of polycondensation products with reticulated structure, Vulkollane of Farbenfabriken Bayer, or of the group of polyamides and superpolyamides. Of course the spherical body may also be formed of another plastic or material with particularly favourable bearing properties.

Figure 1:
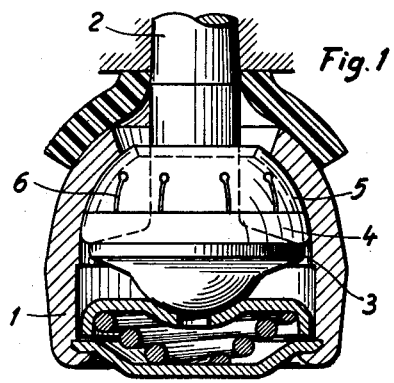
Fig. 1 shows a journal bearing in the form of a carrying joint with edge protection formed by means of a cap.

According to Fig. 1 the side of the spherical section 4 turned towards the outlet of the stud 2 from the casing is provided with a cap 5 of steel plate which for the purpose of easier manufacture and for the formation of lubrication grooves is formed with slits 6 on the side turned away from the outlet of the spindle 2 from the casing 1.

The spherical section 4 is offset by the thickness of the cap 5 so that the upper surface of the cap 5 is in alignment or continuous with the upper surface of the spherical section 4.

Figure 2:
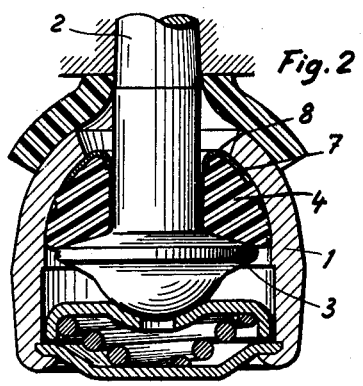
Fig. 2 is an embodiment corresponding to Fig. 1 in which the edge protection extends also to the edging of the bearing body turned towards the journal.

In Fig. 2 a smaller cap 7 is provided. The edge 8 of the cap 7 which is turned towards the stud 2 is bent in the outlet of the spherical section 4 for the stud 2 whereby the passage at the bent over area is so enlarged in diameter that the surface of the bent edge is in alignment with the passage surface. The bent edge 8 can extend over the whole length of the passage.

Figure 3:
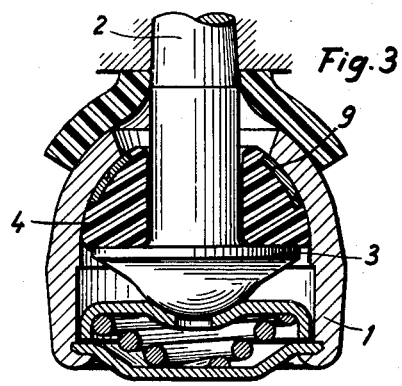
Fig. 3 is an embodiment with an edge protection formed by means of a hollow spherical zone.

The formation of the protection opposite the edge at the outlet of the stud 2 from the casing seen in Fig. 3 is formed by a hollow spherical annulus 9 of steel which is so inserted in the spherical section that the upper surface of the hollow spherical zone is concentric with the upper surface of the spherical section.

Figure 4:
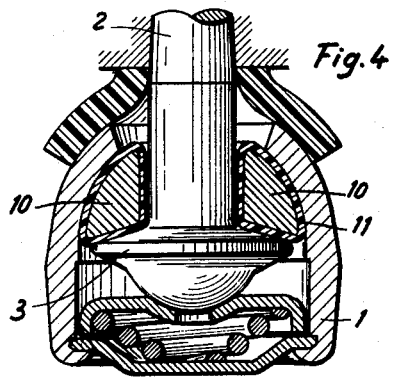
Fig. 4 illustrates a carrying spherical joint with covered spherical body.
Figure 5:
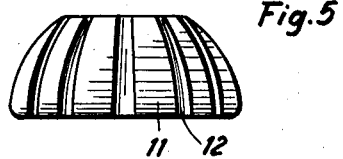
Fig. 5 shows the spherical body of the joint according to Fig. 4.

The embodiment according to Fig. 4 is provided with a spherical section the core 10 of which consists of steel, bronze, sintered iron, fabric impermeated with resin or the like and is provided with a covering 11 of resilient plastic. The resilient covering is formed with ribs 12 (see Fig. 5) the upper surface of which is concentric or substantially concentric with the upper surface of the covering 11.

Figure 6:
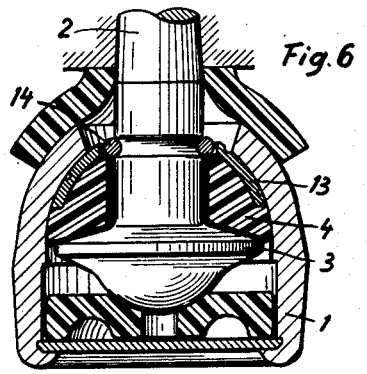
Fig. 6 shows the arrangement of a spring ring between the journal and the edge protection cap.
Figure 7:
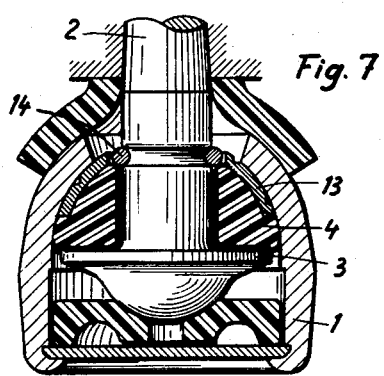
Fig. 7 shows an arrangement similar to Fig. 6 wherein the stud receives bearing ring 4.

In the embodiment according to Fig. 6 a spring ring 14 is provided between the edge of the steel cap 13 turned towards the spindle 2 which ring rests in a peripheral groove of the spindle 2.

What we claim is:

1. Angularly movable ball headed joint for the steering gear of motor vehicles or the like comprising, a housing presenting a spherical bearing surface and having an aperture adjacent said bearing surface, a ball headed stud having a ball head disposed in said housing and a stud extending upwardly through said aperture, said ball head including a ring shaped portion having a spherical outer surface of artificial material such as plastic in engagement with the inner portion of said bearing surface remote from said aperture and having a partial armoring of wear and pressure resisting material in engagement with another portion of said spherical bearing surface adjacent said aperture, said armoring being in engagement with the inner edge of said aperture for any angular position of said stud, and being in the form of a shell, said ring shaped portion being recessed in the area covered by said armoring to receive said armoring in a manner that the outer spherical surface of said ring shaped portion is continuous and presenting a cylindrical aperture through which said stud extends.

2. Angularly movable ball headed joint for the steering gear of motor vehicles or the like comprising, a housing presenting a spherical bearing surface and having an aperture adjacent said bearing surface, a ball headed stud having a ball head disposed in said housing and a stud extending upwardly through said aperture, said ball head having a spherical outer surface of artificial material such as plastic in engagement with a portion of said bearing surface and having a partial armoring of wear and pressure resisting material in engagement with another portion of said spherical bearing surface adjacent said aperture, said armoring being in engagement with the inner edge of said aperture for any angular position of said stud, and being in the form of a cap, and said ball head being recessed in the area covered by said armoring to receive said armoring in a manner that the outer spherical surface of said ball head is continuous, and said ball head having a section disposed around said stud constituting the bearing portion of said ball head in said housing and presenting a cylindrical aperture through which said stud extends and said armoring being peened over the end of said ball section disposed around said stud with its surface adjacent said stud in alignment with said cylindrical aperture.

3. Angularly movable ball headed joint for the steering gear of motor vehicles or the like comprising, a housing presenting a spherical bearing surface and having an aperture adjacent said bearing surface, a ball headed stud having a ball head disposed in said housing and a stud extending upwardly through said aperture, said ball head including a ring shaped portion having a spherical outer surface of artificial material such as plastic in engagement with the inner portion of said bearing surface remote from said aperture and having a partial armoring of wear and pressure resisting material in engagement with another portion of said spherical bearing surface adjacent said aperture, said armoring being in engagement with the inner edge of said aperture for any angular position of said stud, and said armoring being defined by a spherical shell section sunk into a recessed portion of the surface of said ring shaped portion and having its outer spherical surface continuous with the spherical surface of said ring shaped portion and said ring shaped portion presenting a cylindrical aperture through which said stud extends.

References Cited in the file of this patent

UNITED STATES PATENTS

| | | |
|---|---|---|
| 1,568,649 | Woodruff | Jan. 15, 1926 |
| 1,751,357 | Ricardo | Mar. 18, 1930 |
| 2,200,129 | Whiteford | May 7, 1940 |
| 2,369,091 | Venditty | Feb. 6, 1945 |
| 2,398,848 | Newey | Apr. 23, 1946 |

FOREIGN PATENTS

| | | |
|---|---|---|
| 493,472 | Great Britain | Oct. 10, 1938 |
| 919,761 | France | Dec. 9, 1946 |